(No Model.)
M. O. REEVES.
BELT.
No. 581,770. Patented May 4, 1897.
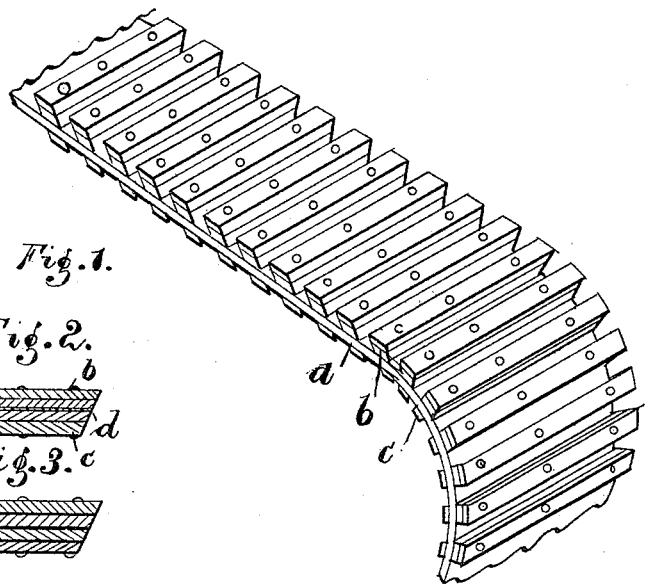
Fig. 1.
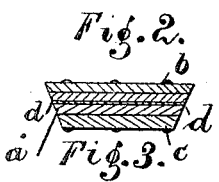
Fig. 2.
Fig. 3.
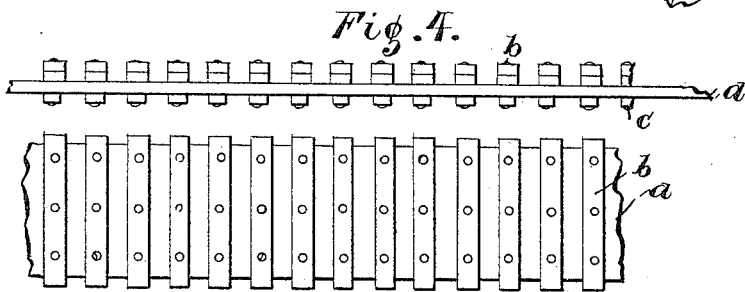
Fig. 4.
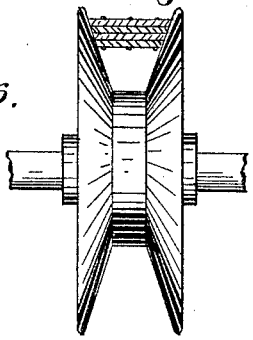
Fig. 5.
Fig. 6.
Witnesses
Inventor
Milton O. Reeves,
By Attorney

UNITED STATES PATENT OFFICE.

MILTON O. REEVES, OF COLUMBUS, INDIANA, ASSIGNOR TO THE REEVES PULLEY COMPANY, OF INDIANA.

BELT.

SPECIFICATION forming part of Letters Patent No. 581,770, dated May 4, 1897.

Application filed July 2, 1896. Serial No. 597,807. (No model.)

*To all whom it may concern:*

Be it known that I, MILTON O. REEVES, a citizen of the United States of America, residing at Columbus, in the county of Bartholomew and State of Indiana, have invented certain new and useful Improvements in Belts, of which the following is a specification.

Ordinary driving-belts for transmitting considerable power have heretofore been made wide in proportion to their thickness in order to obtain sufficient driving-surface to carry the load. The expense of wide belting is very large and its use is subject to many inconveniences and not a little danger. The space occupied is considerable and the wide belting does not coöperate readily with speed-varying mechanism.

The objects of my invention are to provide a narrow driving-belt having a driving capacity equal to or greater than that of a belt of much greater width; to provide a belt which will coöperate readily with speed-varying mechanism, and to provide a belt which can be produced at much less expense, in proportion to its driving capacity, than the ordinary belting; and my invention consists in the combination and arrangement of parts of which the belt is composed.

In the drawings, Figure 1 is a perspective view of a section of my improved belt; Fig. 2, a cross-section showing one form of the same; Fig. 3, a cross-section showing another form; Fig. 4, a side elevation; Fig. 5, a plan, and Fig. 6 a view showing a form of pulley adapted to be used with my belt.

The belt consists of a continuous strip $a$, of leather or other flexible material adapted to withstand the tensile strain. To the faces of this strip, at short distances from each other, cross-strips $b$ and $c$ are riveted or otherwise secured, and the edges of the continuous strip and ends of the lateral strips are beveled, as shown at $d$. The lateral strips serve to render the belt rigid in cross-section and to increase the bearing-surface, while the spaces between them afford sufficient flexibility longitudinally. The number and thickness of the lateral strips may be varied indefinitely. If they do not make the belt sufficiently rigid in cross-section, they may be reinforced by strips $e$, of steel or other rigid material.

The belt is adapted for use with a pulley having interior faces sloping toward each other.

In operation the tension of the belt wedges it into the groove formed by the sloping faces of the pulley, and a far stronger grip is obtained than would be afforded by the same amount of bearing-surface in ordinary belting. Experiment shows that the tractional power of the belt is very large in proportion to its driving-surface and that it leaves the pulley easily and without dragging.

I claim as my invention—

A belt consisting of a continuous strip with a series of lateral strips secured to each side thereof, and having beveled driving edges, substantially as and for the purpose set forth.

MILTON O. REEVES.

Witnesses:
JOHN JEWELL,
I. H. REEVES.